US012673778B2

(12) United States Patent　　(10) Patent No.:　US 12,673,778 B2
Ashida et al.　　(45) Date of Patent:　Jul. 7, 2026

(54) SAFETY DEVICE AND FLIGHT VEHICLE PROVIDED WITH SAFETY DEVICE

(71) Applicant: NIPPON KAYAKU KABUSHIKI KAISHA, Tokyo (JP)

(72) Inventors: Syouichi Ashida, Himeji (JP); Hiroshi Nakamura, Himeji (JP)

(73) Assignee: NIPPON KAYAKU KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/703,557

(22) PCT Filed: Nov. 7, 2022

(86) PCT No.: PCT/JP2022/041463
§ 371 (c)(1),
(2) Date: Apr. 22, 2024

(87) PCT Pub. No.: WO2023/080249
PCT Pub. Date: May 11, 2023

(65) Prior Publication Data
US 2024/0391614 A1　　Nov. 28, 2024

(30) Foreign Application Priority Data

Nov. 8, 2021　(JP) ................................. 2021-182206

(51) Int. Cl.
*B64D 17/72*　　(2006.01)
*B64D 17/80*　　(2006.01)
*B64U 70/83*　　(2023.01)
(52) U.S. Cl.
CPC ............. *B64D 17/80* (2013.01); *B64D 17/72* (2013.01)
(58) Field of Classification Search
CPC ........ B64D 17/80; B64D 17/72; B64D 17/62; B64U 70/83
See application file for complete search history.

(56) References Cited

U.S. PATENT DOCUMENTS 1,776,629 A * 9/1930 Kugler ................... B64D 17/54
244/147
12,227,298 B2 * 2/2025 Kubo ..................... B64D 17/76
(Continued)

FOREIGN PATENT DOCUMENTS

CN　　205387200 U　　7/2016
JP　　2017-535477 A　　11/2017
(Continued)

OTHER PUBLICATIONS

Extended European Search Report dated Apr. 14, 2025, issued in counterpart EP Application No. 22890069.2, (6 pages).
(Continued)

*Primary Examiner* — Brian M O'Hara
(74) *Attorney, Agent, or Firm* — Oblon, McClelland, Maier & Neustadt, L.L.P.

(57)　　ABSTRACT

A safety device and a flight vehicle provided with the safety device. The safety device includes an actuator, an ejection object ejected in one direction by the activation of the actuator, a bottomed cylindrical housing lid (bottomed cylindrical member) that houses the actuator and the ejection object, and a substantially disk-shaped bottom portion that closes an opening end portion of the housing lid. One end of the first coupling member is connected to a part of the ejection object, and the other end of the first coupling member is connected to the inside of the housing lid. The actuator includes a piston member and a gas generator that generates a driving force for ejecting the housing lid by sliding the piston member and causing the piston member to abut on the housing lid and is provided on the bottom portion. One end of the second coupling member is connected to the other part of the ejection object, and the other end of the second coupling member is connected to a tip portion.

13 Claims, 10 Drawing Sheets

(56) References Cited

U.S. PATENT DOCUMENTS

| | | | | |
|---|---|---|---|---|
| 2016/0221681 | A1 * | 8/2016 | Babovka | B64D 17/42 |
| 2017/0225792 | A1 * | 8/2017 | Wang | B64D 17/70 |
| 2018/0312264 | A1 | 11/2018 | Cook et al. | |
| 2023/0294853 | A1 * | 9/2023 | Silin | B64D 17/62 |
| | | | | 244/148 |

FOREIGN PATENT DOCUMENTS

| | | | | | |
|---|---|---|---|---|---|
| JP | 2021-20542 | A | | 2/2021 | |
| JP | 2021-70425 | A | | 5/2021 | |
| JP | 7344760 | B2 * | | 9/2023 | B64D 17/52 |
| JP | 2025157007 | A | * | 10/2025 | |
| KR | 10-2016-0019672 | A | | 2/2016 | |
| KR | 10-1843376 | B1 | | 3/2018 | |
| WO | WO-2025052969 | A1 * | | 3/2025 | B64D 17/32 |

OTHER PUBLICATIONS

International Search Report issued on Dec. 13, 2022 in PCT/JP2022/041463 filed on Nov. 7, 2021, 2 pages.

* cited by examiner (a)

SAFETY DEVICE AND FLIGHT VEHICLE PROVIDED WITH SAFETY DEVICE

TECHNICAL FIELD

The present invention relates to a safety device that ejects an ejection object such as a parachute or a paraglider, and a flight vehicle provided with the safety device.

BACKGROUND ART

In recent years, with the development of autonomous control technology and flight control technology, industrial use of a flight vehicle provided with a plurality of rotors called, for example, a drone is accelerating. The drone flies, for example, by simultaneously rotating a plurality of rotors in a balanced manner, and ascent and descent can be performed by increasing or decreasing the rotation speed of the rotors, and forward and backward movement can be performed by inclining an airframe through increasing or decreasing the rotation speed of the rotors. Such flight vehicles are expected to expand worldwide in the future.

On the other hand, the risk of a falling accident of the flight vehicle as described above is considered dangerous, which hinders the spread of the flight vehicle. In order to reduce the risk of such a falling accident, a parachute device for a flight vehicle is being commercialized as a safety device.

For example, as an example of the parachute safety device, the applicant filed an application according to Patent Literature 1 below. As illustrated in FIG. 1 of Patent Literature 1 below, a safety device of Patent Literature 1 includes: a piston member (sliding member); a cylinder that houses the piston member and is provided with a hole through which the piston member protrudes outward at the time of activation; a push-up member that is pushed up in one direction by the piston member; an ejection object that is pushed up while being supported by the push-up member; a gas generator that moves the piston member in the cylinder; and a container that houses the ejection object or the like, in which the push-up member includes a support portion disposed on a distal end side of the piston member with respect to a tip of the piston member in a moving direction of the piston member. Furthermore, a bottom portion of the push-up member is fixed to a tip portion of the piston member.

CITATIONS LIST

Patent Literature

Patent Literature 1: JP 2020-1680 A

SUMMARY OF INVENTION

Technical Problems

The safety device as disclosed in Patent Literature 1 is mounted on a flight vehicle or the like, and thus further downsizing and weight reduction are desired.

Therefore, an object of the present invention is to provide a safety device that can be made smaller and lighter than conventional ones, and a flight vehicle provided with the safety device.

Solutions to Problems (1) A safety device according to the present invention includes: a bottomed cylindrical member including an opening end portion provided at one end and a top plate portion provided at an other end; a bottom portion attached to the opening end portion of the bottomed cylindrical member in an initial state, and provided so that the opening end portion can be opened at the time of activation; an actuator provided on the bottom portion, and including a sliding member and a power source that generates a driving force for ejecting the bottomed cylindrical member by sliding the sliding member toward the top plate portion and causing the sliding member to abut on the bottomed cylindrical member; an ejection object accommodated between the bottomed cylindrical member and the bottom portion; a first coupling member including one end coupled to the ejection object and an other end coupled to the bottomed cylindrical member; and a second coupling member including one end coupled to the sliding member, the bottom portion, or an external payload, and an other end coupled to the ejection object, in which in a case where the bottomed cylindrical member is ejected, the ejection object is also ejected so as to be pulled out via the first coupling member. Here, the payload is, for example, a "flight vehicle", a "cargo", a "measurement device that measures an environment such as the air or the sea", or the like.

(2) In the safety device of (1) described above, it is preferable that the sliding member is provided at a position where the sliding member abuts on a central portion of the top plate portion of the bottomed cylindrical member at the time of activation, and the central portion is a portion or a member having higher strength than a portion other than the central portion and having impact strength against impact when the sliding member abuts on the central portion.

(3) In the safety device of (1) or (2) described above, it is preferable that the other end of the first coupling member is coupled to a location other than a position where the sliding member abuts on the central portion, and the central portion is a portion or a member having higher strength than a portion other than the central portion and having impact strength against impact when the first coupling member is pulled at the time of activation.

(4) In the safety device of (1) to (3) described above, it is preferable that the bottom portion includes, at an edge portion, a protruding portion facing a side wall portion of the bottomed cylindrical member before activation, and the safety device further includes: an engagement mechanism that engages a side wall portion of the opening end portion and the protruding portion by inserting a pin member into a first through hole penetrating toward a center of the bottomed cylindrical member in the side wall portion of the opening end portion and a second through hole penetrating toward a center of the bottom portion in the protruding portion; or a locking mechanism that locks the side wall portion of the opening end portion and the protruding portion by a snap-fit method in which fitting is performed using elasticity of a material constituting the bottomed cylindrical member or the protruding portion.

(5) A flight vehicle according to the present invention includes: an airframe; any one of safety devices of (1) to (4) described above coupled to the airframe, the payload being the flight vehicle; and a propulsion mechanism coupled to the airframe to propel the airframe.

Advantageous Effects of Invention

According to the present invention, it is possible to provide a safety device that can be made smaller and lighter than conventional ones, and a flight vehicle provided with the safety device.

BRIEF DESCRIPTION OF DRAWINGS

FIG. 7 is a diagram illustrating a state after activation of a safety device according to a modification of the present invention.

DESCRIPTION OF EMBODIMENT

Hereinafter, a safety device and a flight vehicle according to an embodiment of the present invention will be described with reference to FIGS. 1 to 5. Note that FIG. 1 is also a cross-sectional view taken along line A-A of the safety device illustrated in FIG. 2(a).

Figure 1:
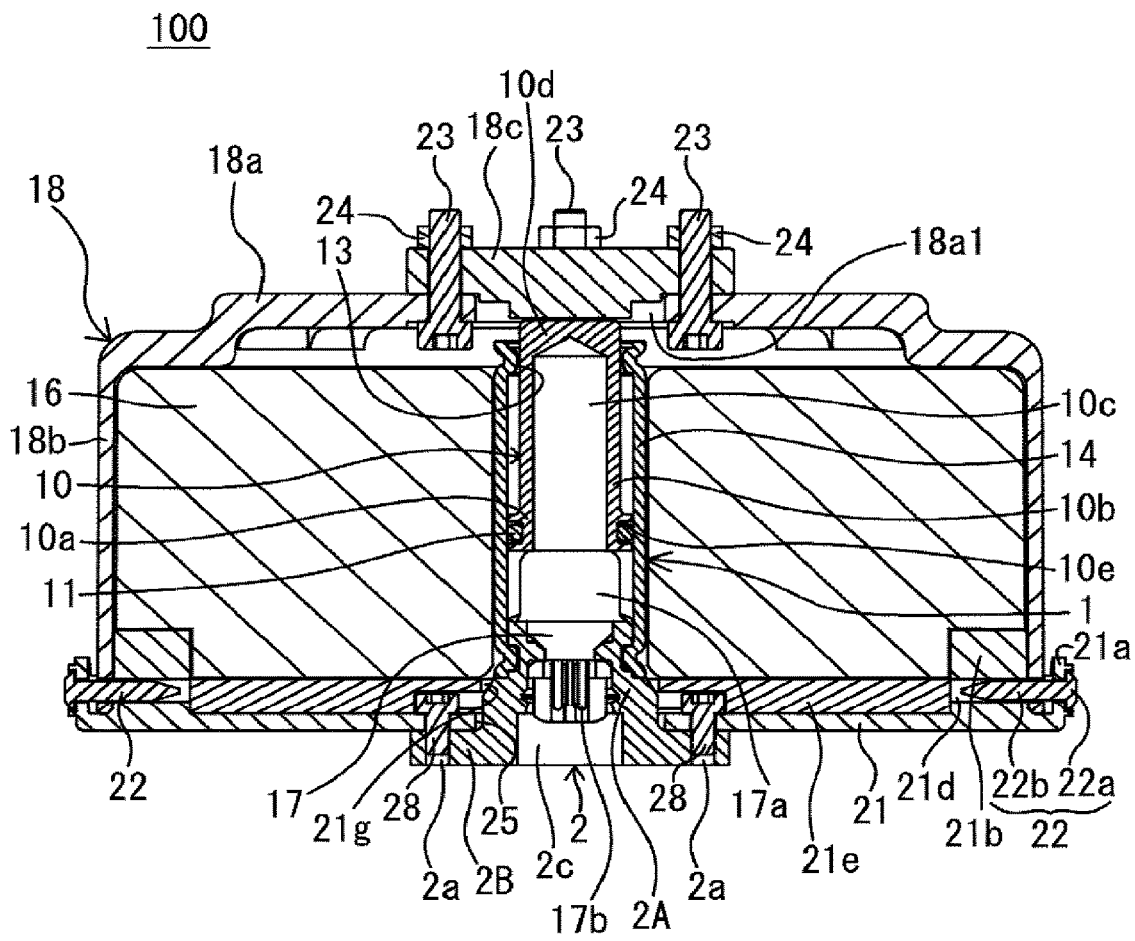
FIG. 1 is a cross-sectional view illustrating an initial state of a safety device according to an embodiment of the present invention.

As illustrated in FIG. 1, a safety device 100 includes an actuator 1, an ejection object 16 ejected in one direction (upward direction in FIG. 1) by the actuation of the actuator 1, a bottomed cylindrical housing lid 18 (bottomed cylindrical member) that houses the actuator 1 and the ejection object 16, and a substantially disk-shaped bottom portion 21 that closes an opening end portion of the housing lid 18. Note that the housing lid 18 and the bottom portion 21 constitute a container. Furthermore, in the present embodiment, the ejection object 16 is a parachute or a paraglider.

The actuator 1 includes a piston member 10 which is a sliding member, a cylinder 14 that accommodates the piston member 10 and is provided with a bore portion 13 for the piston member 10 to protrude outward (upward direction in FIG. 1) at the time of activation, a base 2 (squib holder) to which one end portion of the cylinder 14 is caulked and fixed and that is attached via a bore portion 25 at a center of the bottom portion 21, and a gas generator (microgas generator or the like) 17 as a power source for moving the piston member 10 in the cylinder 14.

The base 2 includes a substantially cylindrical member 2A that holds the gas generator 17 that generates power for sliding the piston member 10 on a side of the cylinder 14, and a flange portion 2B provided on a side opposite to a side of the cylinder 14 of the substantially cylindrical member 2A.

The flange portion 2B includes a plurality of bore portions 2a used for attachment to the bottom portion 21, a plurality of fixing bores (not illustrated) used for attachment to an airframe 31 of a flight vehicle 30 to be described later, and an insertion port 2c used for fitting a connector (not illustrated) for energization into an electrode 17b under the gas generator 17, and is processed into a substantially horseshoe shape (not illustrated) having a substantially U shape. An inner wall of each of the bore portions 2a is internally threaded, and a bolt 28 to be described later is screwed. Furthermore, an inner wall of each of the fixing bores (not illustrated) is also internally threaded, and a bolt (not illustrated) is screwed into a flight vehicle 30 to be described later from aside of the airframe 31, so that the base 2 can be fixed to the airframe 31.

The piston member 10 includes a main body portion 10a including a portion having an outer diameter substantially equal to an inner diameter of the cylinder 14, a rod-shaped portion 10b connected to the main body portion 10a, extending upward, and having a smaller diameter than the main body portion 10a, a bore portion 10c provided inside the main body portion 10a and the rod-shaped portion 10b, a tip portion 10d provided at an upper end portion of the rod-shaped portion 10b, and a groove portion 10e provided in a circumferential direction of the main body portion 10a. A diameter of the main body portion 10a is smaller than a diameter of the bore portion 13. That is, the bore portion 13 has a stopper function for the piston member 10 at the time of activation.

The bore portion 10c is formed along a central axis from a lower end portion of the main body portion 10a to the middle of the rod-shaped portion 10b. As a result, the weight of the piston member 10 is reduced as compared with the case where the bore portion 10c is not formed.

As illustrated in FIG. 1, the tip portion 10d is configured to be in contact with an inner side of the housing lid 18 (more specifically, a disk portion 18c (central portion) to be described later) in the initial state.

The groove portion 10e is provided with a sealing member 11 such as an O-ring in the circumferential direction.

Figure 3:
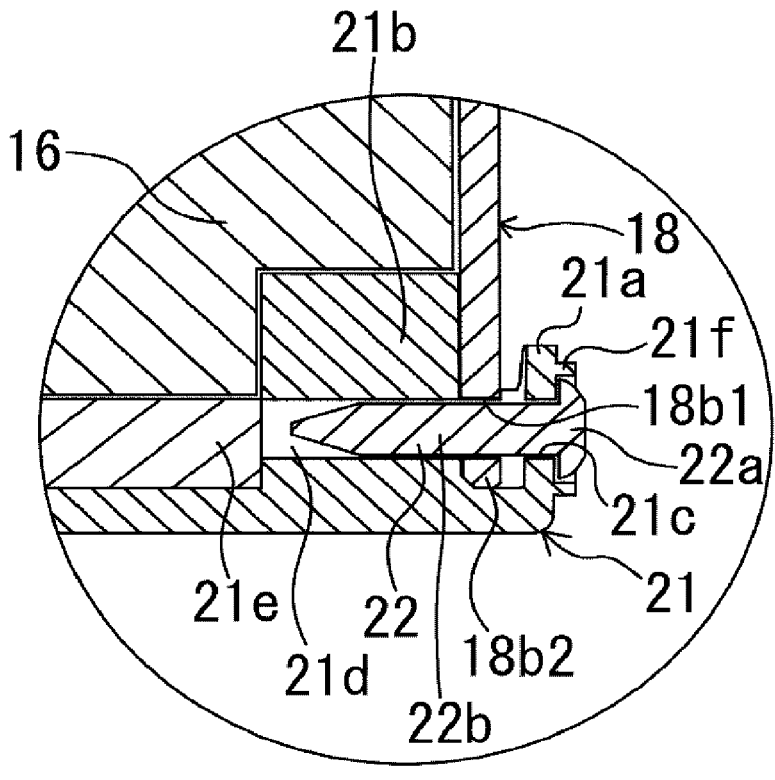
FIG. 3 is an enlarged view of a part of the safety device in FIG. 1.

As illustrated in FIG. 3, the bottom portion 21 includes a cylindrical protruding portion 21a extending from an edge portion toward the housing lid 18, and a receiving member 21b provided so as to protrude toward the housing lid 18 at a position facing the protruding portion 21a and sandwiching an opening end portion of the housing lid 18. Furthermore, a reinforcement member 21e that reinforces the bottom portion 21 is provided inside a bottom surface of the bottom portion 21.

Figure 2:
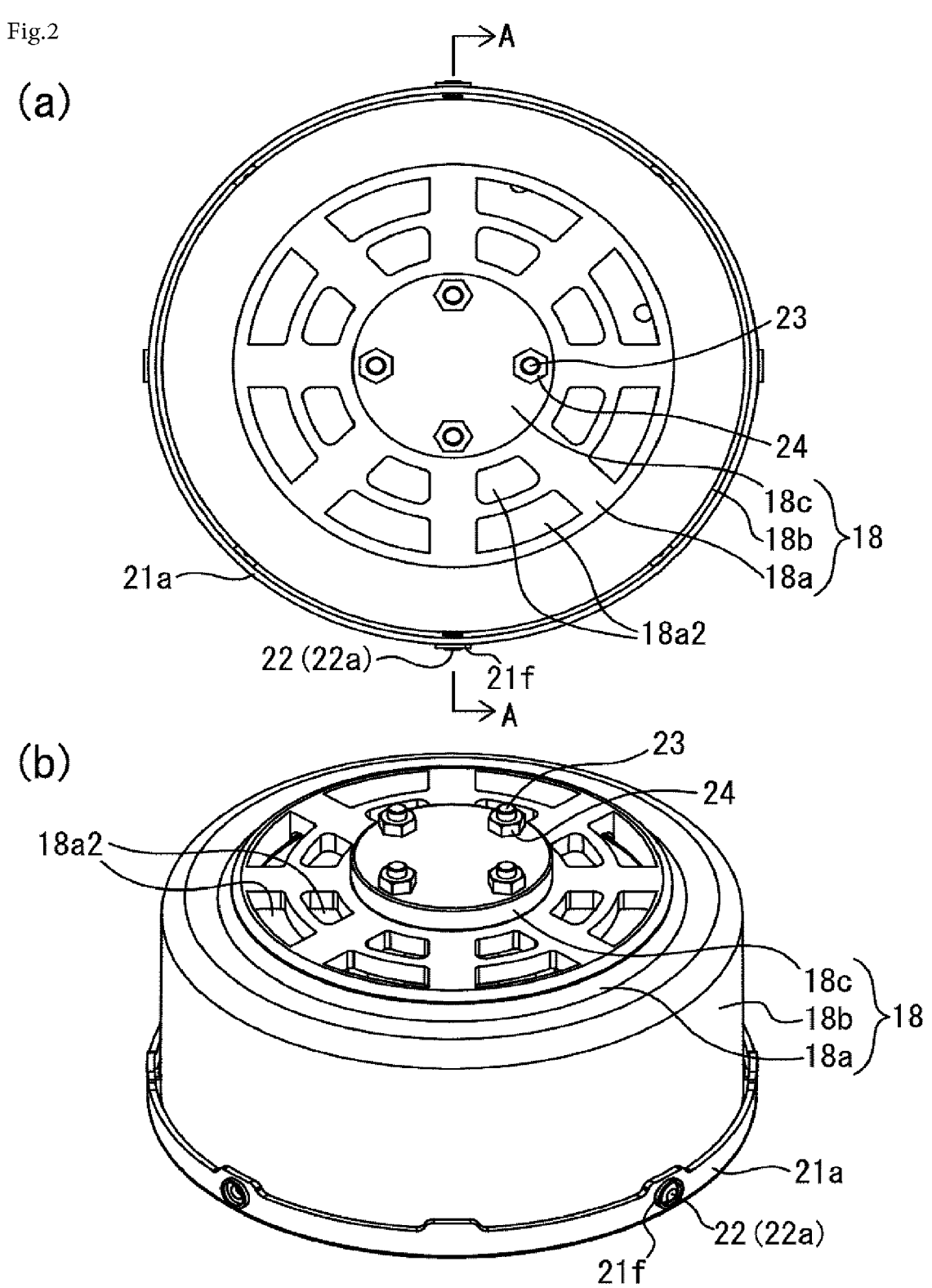
FIG. 2(a) is a plan view of the safety device of FIG. 1.
FIG. 2(b) is a perspective view of the safety device of FIG. 1.

As illustrated in FIG. 3, the protruding portion 21a includes a second through hole 21c penetrating toward a center of the bottom portion 21. Furthermore, as illustrated in FIGS. 2 and 3, a cylindrical projecting portion 21f that communicates with a first through hole 18b1 to be described later and includes a circumferential wall portion surrounding an outer circumference of a head portion 22a on the inner side is formed outside the protruding portion 21a. As a result, it is possible to prevent a pin member 22 from being pulled out and the bottom portion 21 from being opened by inserting a nail puller, a flathead screwdriver, or the like. Note that by inserting the pin member 22 into the second through hole 21c and the first through hole 18b1 to be described later, an engagement mechanism that engages the opening end portion of the housing lid 18 with the protruding portion 21a is configured. Here, the protruding portion 21a has a cylindrical shape, but may be any protruding portion (such as a projecting portion) provided so as to face the receiving member 21b and including the second through hole 21c, and may not necessarily have a cylindrical shape.

As illustrated in FIG. 3, the receiving member 21b includes a second through hole 21d penetrating toward the center of the bottom portion 21. In a case where the pin member 22 is inserted into the second through hole 21c and the first through hole 18b1, the second through hole 21d receives a tip portion of the pin member 22 (the tip portion of the pin member 22 is inserted), and the fixation between the opening end portion of the housing lid 18 and the bottom portion 21 can be made more robust.

As illustrated in FIG. 3, the pin member 22 includes the head portion 22*a* having a diameter larger than that of the second through hole 21*c*, and a rod-shaped portion 22*b* provided with the head portion 22*a* at one end and inserted and fitted into the first through hole 18*b*1, the second through hole 21*c*, and the second through hole 21*d*. Note that the pin member 22 is provided with a locking portion (not illustrated) that prevents the pin member from being removed after being inserted into the first through hole 18*b*1, the second through hole 21*c*, and the second through hole 21*d* before activation. Specific examples of such a pin member 22 include a brush clip pin, a trim clip pin, and the like, but are not limited thereto, and any pin member may be used as long as it includes a locking portion (including one having a relatively high frictional force on a surface of the rod-shaped portion 22*b*) that prevents the pin member from being removed after being inserted into the first through hole 18*b*1, the second through hole 21*c*, and the second through hole 21*d*. Here, in the present embodiment, as illustrated in FIG. 2(*a*), a pair of the pin members 22 is provided so as to face each other in the vertical direction of the paper surface, but the present invention is not limited thereto, and for example, another pair of pin members 22 may be provided so as to face each other in the horizontal direction of the paper surface.

The reinforcement member 21*e* is a substantially disk-shaped member in which a bore portion 21*g* (see FIG. 1) is formed in a central portion, and is used to support the ejection object 16 and protect the ejection object 16 from the bolt 28 while reinforcing the bottom surface of the bottom portion 21. Note that the reinforcement member 21*e* is not necessarily a disk-shaped member and may have any configuration as long as it supports the ejection object 16 and protects the ejection object 16 from the bolt 28.

As illustrated in FIGS. 1 and 2, the housing lid 18 is a substantially bottomed cylindrical member including a substantially disk-shaped top plate portion 18*a*, a cylindrical side portion 18*b*, and a disk portion 18*c*. The top plate portion 18*a* includes a bore portion 18*a*1 (see FIG. 1) at a central portion closed by the disk portion 18*c* and a plurality of bore portions 18*a*2 (see FIG. 2) provided around the bore portion 18*a*1 and communicating with the outside, and is formed at an upper end portion of the side portion 18*b*.

As illustrated in FIG. 3, the side portion 18*b* includes the first through hole 18*b*1 and a breakable portion 18*b*2 in the vicinity of the opening end portion. The breakable portion 18*b*2 is a location of the first through hole 18*b*1 that breaks when a predetermined force or more is applied downward on the paper surface of FIG. 3.

As illustrated in FIGS. 1 and 2, the disk portion 18*c* is fixed to the housing lid 18 by a plurality of sets of bolts 23 and nuts 24 so as to be in a position where the tip portion of the piston member 10 abuts at the time of activation. Note that the disk portion 18*c* is formed of another member (For example, the disk portion 18*c* is made of metal (iron or the like), an alloy, or a composite reinforced member (fiber reinforced plastic or the like), and other portions of the housing lid 18 are made of resin or the like) having higher strength than the other portions (top plate portion 18*a* and side portion 18*b*) of the housing lid 18, and is formed of a member having impact strength against impact when the tip portion of the piston member 10 abuts on the disk portion 18*c*. Therefore, it is only necessary to set the portion other than the disk portion 18*c* of the housing lid 18 to a minimum necessary strength (for example, a strength sufficient to protect the ejection object 16 until at the time of activation), and the weight of the housing lid 18 can be reduced.

The gas generator 17 is disposed below the main body portion 10*a* described later of the piston member 10 in a state of being press-fitted into an opening end below the cylinder 14.

As the gas generator 17, only an igniter may be used, or a gas generator including an igniter and a gas generating agent may be used. Furthermore, a hybrid type or a stored type gas generator that cleaves a sealing plate in a small gas cylinder by a gunpowder type igniter and discharges internal gas to the outside may be used. In this case, as a pressurized gas in the gas cylinder, a non-flammable gas such as argon, helium, nitrogen, or carbon dioxide, or a mixture thereof can be used. Furthermore, in order to reliably propel the piston when the pressurized gas is released, the gas generator may be provided with a heating element including a gas generating agent composition, a thermite composition, or the like.

The ejection object 16 is folded and accommodated between an inner surface of the housing lid 18 and an inner surface of the bottom portion 21, for example, so as to surround an outer surface of the cylinder 14. Note that one ends of coupling members 41 and 42 (See FIGS. 5 and 6) that are first coupling members are connected to a part of the ejection object 16, and the other ends of the coupling members 41 and 42 are connected to the inside of the housing lid 18 (For example, the piston member 10 is fastened to a hook or a bore portion (not illustrated) provided at a location other than a position where the piston member 10 abuts (comes into contact with) the disk portion 18). Furthermore, one end of a coupling member 43 (see FIG. 6) that is a second coupling member is connected to the other part of the ejection object 16, and the other end of the coupling member 43 is connected to the tip portion 10*d* of the piston member 10. Here, the one end of the coupling member 43 may be coupled to the bottom portion 21 or the payload, or the coupling member 43 may be a plurality of the coupling members.

Here, in a case where the coupling members 41 and 42 are fastened to the disk portion 18*c*, the disk portion 18*c* is made of a member (metal (iron or the like), an alloy, or a composite reinforced member (fiber reinforced plastic or the like) that resists an impact when being pulled from the coupling members 41 and 42 at the time of activation, so that it is only necessary to set a portion other than the disk portion 18*c* of the housing lid 18 to a minimum necessary strength (for example, a strength sufficient to protect the ejection object 16 until at the time of activation), and thus the weight of the housing lid 18 can be reduced. Note that by adjusting the lengths of the coupling members 41 and 42 and/or the output of the actuator 1, it is possible to control how long the ejection object 16 is pulled out from the ejection of the housing lid 18.

Figure 5:
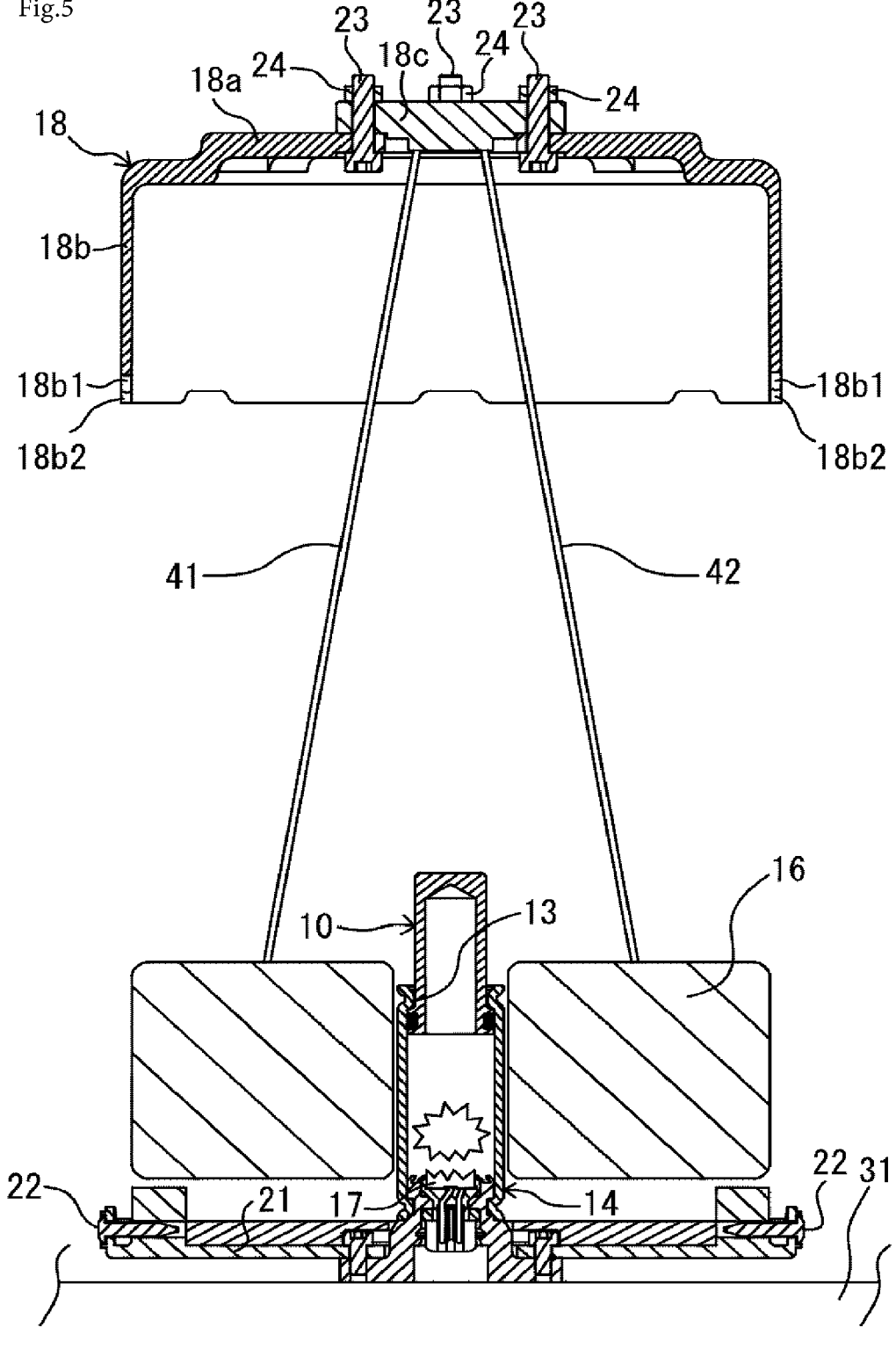
FIG. 5 is a cross-sectional view illustrating a state in the middle of activation of the safety device of FIG. 1.
Figure 6:
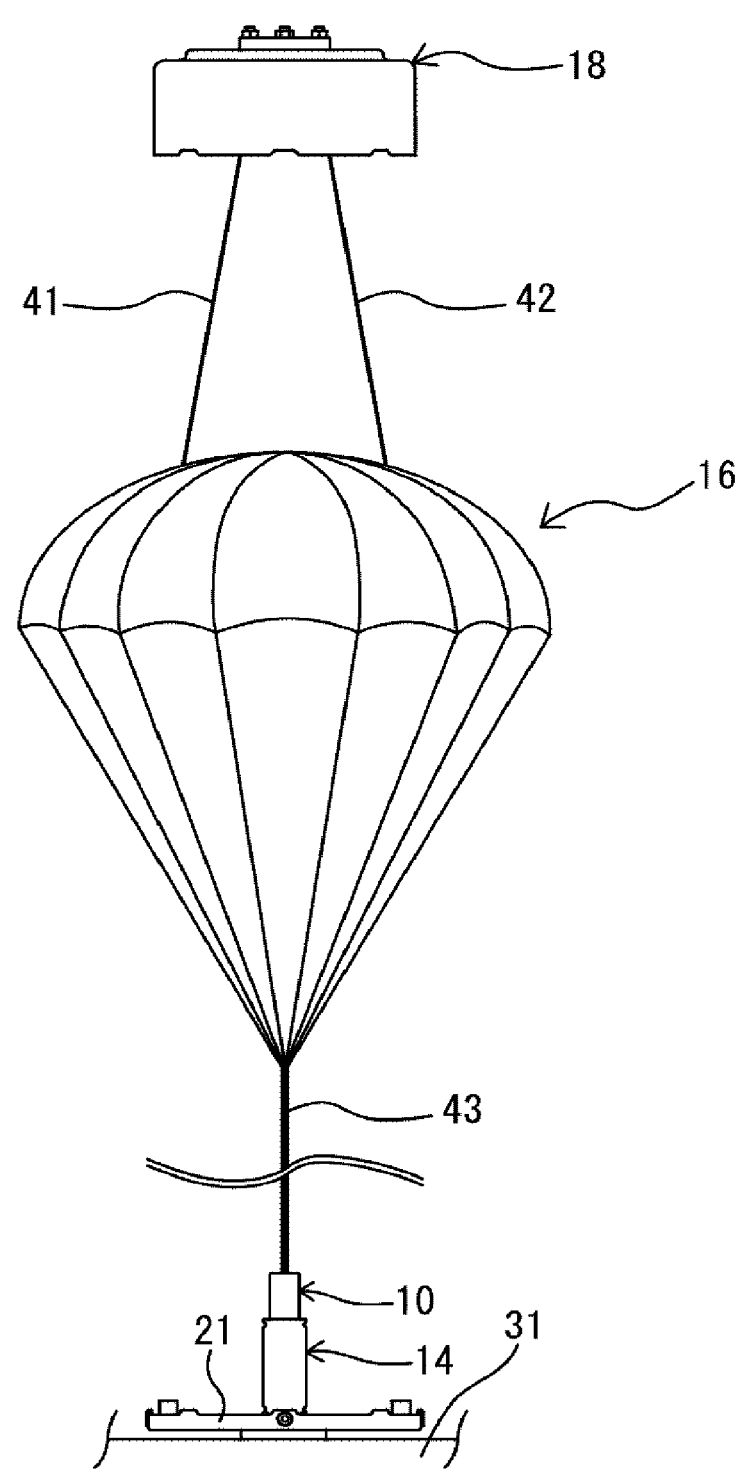
FIG. 6 is a diagram illustrating a state after the safety device in FIG. 1 is activated.

In the above configuration, when the gas generator 17 is activated when, for example, a flight vehicle or the like on which the safety device 100 is mounted falls, the piston member 10 is propelled upward in the cylinder 14 by the pressure of the gas generated by the activation from the initial state of FIG. 1. As a result, the breakable portion 18*b*2 of the housing lid 18 is broken, the opening end portion of the housing lid 18 is opened, the housing lid 18 is detached from the bottom portion 21, and the housing lid 18 is ejected upward while pulling up one ends of the coupling members 41 and 42. Subsequently, as illustrated in FIG. 5, when tension is applied to the coupling members 41 and 42, the ejection object 16 is ejected toward the housing lid 18 so as to be pulled up. Then, as illustrated in FIG. 6, after the ejection object 16 is deployed, the bottom portion 21 is suspended by the ejection object 16 via the coupling member 43, the piston member 10, and the cylinder 14.

Figure 4:
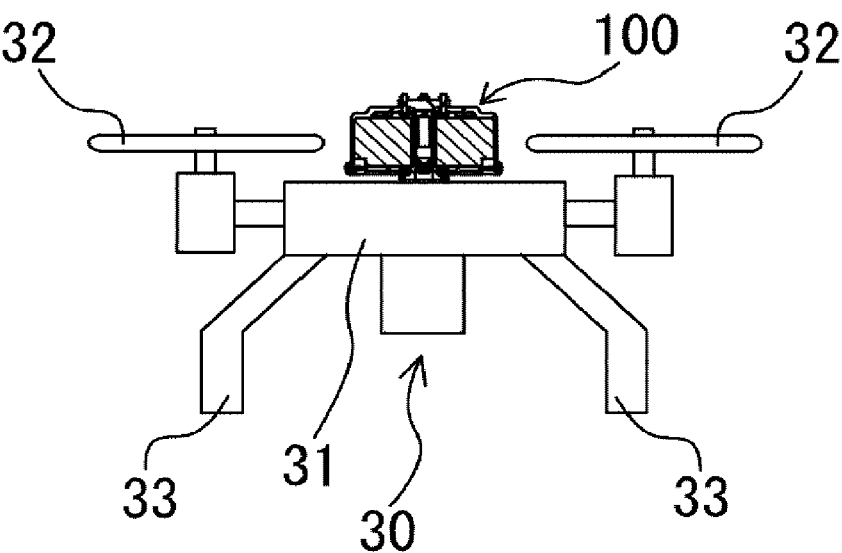
FIG. 4 is a diagram illustrating an example of a flight vehicle on which the safety device of FIG. 1 is mounted.

Note that, as illustrated in FIG. 4, the safety device 100 is coupled and fixed to the airframe 31 of the flight vehicle 30 by bolts (not illustrated) from a side of the airframe 31 via fixing bore portions (not illustrated) of the base 2. Therefore, the flight vehicle 30 includes the airframe 31, the safety device 100 coupled to the airframe 31, one or more propulsion mechanisms (for example, propellers) 32 coupled to the airframe 31 to propel the airframe 31, and a plurality of legs 33 provided in a lower portion of the airframe 31.

According to the safety device 100 having the above configuration, since the number of components can be reduced as compared with the related art, it is possible to reduce the size and weight.

Furthermore, since the ejection object 16 such as a parachute is a soft body (film-shaped member or the like), when the ejection object 16 is ejected with a short stroke, the ejection object 16 conventionally absorbs the driving force of the gas generator 17, and the driving force cannot be effectively used. However, according to the safety device 100 having the above configuration, the ejection object 16 can be ejected so as to be pulled out by the ejected housing lid 18 (rigid body). That is, even with a short stroke, the driving force of the gas generator 17 is transmitted to the housing lid 18 without loss, and the ejection object 16 is pulled up with the ejected momentum of the housing lid 18, so that the driving force can be effectively used. Therefore, even if the stroke of the actuator 1 is shortened, the ejection object 16 can be sufficiently ejected, so that the safety device 100 can be made smaller and lighter than the conventional one. In particular, since the entire length of the actuator 1 can be made shorter than that in the related art, the entire shape of the container can be flattened more than in the related art. As a result, in a case where the safety device 100 is mounted on the flight vehicle 30, the center of gravity can be more easily stabilized than before, and the air resistance during flight can be reduced.

Furthermore, according to the safety device 100 having the above configuration, the movement of the piston member 10 is stopped in the bore portion 13 of the cylinder 14, but conventionally, it is necessary to stop the piston member and other members connected to the piston member in the bore portion of the cylinder. That is, according to the safety device 100 having the above configuration, only the piston member 10 needs to be stopped, so that an impact force related to the stop is smaller than before. Therefore, there is no problem in terms of strength even if the strength of the actuator 1 is reduced as compared with the related art as long as it is within an appropriate range. That is, for example, by making a thickness of the cylinder 14 thinner than the conventional one within an appropriate range, the actuator 1 can be made lighter than the conventional one.

Furthermore, according to the safety device 100 having the above-described configuration, since the housing lid 18 is ejected before the ejection object 16 is ejected, sliding resistance of the ejection object 16 with respect to the housing lid 18 does not occur. Therefore, a decrease in the ejection speed of the ejection object 16 can be prevented.

Furthermore, according to the safety device 100 having the above configuration, since the flange portion 2B of the base 2 is provided outside the bottom portion 21, the base 2 can be directly attached to the airframe 31 of the flight vehicle 30. As a result, the airframe 31 is directly subjected to the reaction at the time of activation, not via the bottom portion 21. However, since the influence at the time of activation on the bottom portion 21 can be reduced, the strength of the bottom portion 21 can be reduced as compared with the case where the base 2 is provided inside the bottom portion 21. That is, the strength of the bottom portion 21 can be reduced more safely than before (for example, as a design for reducing the thickness of the bottom portion 21 to a predetermined safe thickness), and the bottom portion 21 as a whole can be made lighter than before while ensuring the same safety as before.

Furthermore, it is possible to obtain the flight vehicle 30 provided with the safety device 100 having the above-described configuration.

Although the embodiment of the present invention have been described above with reference to the drawings, specific configurations are not limited to this embodiment. The scope of the present invention is defined not by the description of the above embodiment but by the claims, and includes meanings equivalent to the claims and all modifications within the scope. For example, the present invention includes the following modifications.

In the above embodiments, the bore portions 18a2 are formed in the housing lid 18, but the bore portions 18a2 may not be formed in order to ensure waterproofness. Note that, even in this case, the housing lid 18 and the bottom portion 21 are separated from each other immediately after the activation, and the outside air flows in, and the pressure in the container constituted by the housing lid 18 and the bottom portion 21 does not become negative at the time of activation. Therefore, it is not necessary to form an air intake port or the like in the housing lid 18 or the bottom portion 21.

Furthermore, in the housing lid 18 of the above embodiment, the disk portion 18c as a separate member is attached so as to close the bore portion 18a1 of the top plate portion 18a, but may be integrally formed of the same member. At this time, the strength (impact strength) of the component may be strengthened to a necessary extent by, for example, making the thickness of a portion corresponding to the disk portion 18c thicker than other portions so as to achieve the same actions and effects as those of the disk portion 18c of the above embodiments.

In the first coupling member of the above embodiments, the two coupling members 41 and 42 are used, but one coupling member or three or more coupling members may be used. Furthermore, the first coupling member of the above embodiments may be coupled to the housing lid 18 and any position of the ejection object 16 or the payload as long as the housing lid 18 and the ejection object 16 are smoothly ejected and deployed. Furthermore, the second coupling member of the above embodiment may be connected to any position of the ejection object 16 or the payload as long as the ejection object 16 is smoothly ejected and deployed.

Furthermore, the inner wall (circumferential wall portion) of the cylindrical projecting portion 21f may be brought into contact with the head portion 22a by pressurization from the outside to the inside of the cylindrical projecting portion 21f of the above embodiment to be caulked and fixed. Accordingly, it is possible to prevent the head portion 22a from coming off and scattering to the outside at the time of activation.

Furthermore, a resin functioning as an adhesive may be filled between the head portion 22a and the inner wall (circumferential wall portion) of the cylindrical projecting portion 21f of the above embodiment and solidified to fix the head portion 22a and the cylindrical projecting portion 21f. Accordingly, it is possible to prevent the head portion 22a from coming off and scattering to the outside at the time of activation.

Furthermore, the head portion 22a and the cylindrical projecting portion 21f that have been caulked and fixed may be further bonded and fixed with resin. As a result, it is possible to further prevent the head portion 22a from coming off and scattering to the outside at the time of activation.

Furthermore, instead of the engagement mechanism of the above embodiment, a snap-fit locking mechanism may be used. Examples of the locking mechanism include: (a) a locking mechanism (not illustrated) in which a recessed portion provided in an inner wall portion of the opening end portion of the housing lid and a protruding portion provided on an inner side of the housing lid on an outer wall side of a protruding portion protruding from a bottom portion are locked; (b) a locking mechanism (not illustrated) in which a protruding portion provided on an inner wall side of the opening end portion of the housing lid and a recessed portion provided on an outer wall side of a protruding portion protruding from a bottom portion on an inner side of the housing lid are locked; and (c) a locking mechanism (not illustrated) in which a protruding portion provided on an inner wall side of a protruding portion of a bottom portion larger than a diameter of the housing lid (the same as in the above-described embodiment except that there is no second through hole 21c) and a recessed portion provided on an outer wall side of the opening end portion of the housing lid are locked, (d) a locking mechanism (not illustrated) in which a recessed portion provided on an inner wall side of a protruding portion (the same as that of the above embodiment except that there is no second through hole 21c) of a bottom portion larger than the diameter of the housing lid and a protruding portion provided on an outer wall side of the opening end portion of the housing lid are locked. Note that the protruding portion here may be a continuous annular projection or may be an independent rod-like projection. Furthermore, the recessed portion here is an annular groove portion in a case where the protruding portion is an annular projection, and may be an annular groove portion or an independent recess in a case where the protruding portion is an independent rod-like projection.

Furthermore, in the above embodiment, a part of the base 2 is located outside the housing lid 18, but the entire base 2 may be located inside the housing lid 18.

Furthermore, in the above embodiment, the gas generator is employed as the power source, but the configuration is not limited as long as the sliding member can apply a driving force for propelling the inside of the cylinder to the sliding member, and for example, an elastic body such as a spring or a member using a pressure by a gas cylinder may be employed.

Furthermore, in the above embodiment, the housing lid 18 is formed in a cylindrical shape, but the present invention is not limited thereto, and may be formed in another shape such as a quadrangular cylinder.

Furthermore, in the above embodiment, in a case where a parachute or a paraglider is employed as the ejection object, the parachute or the paraglider may be packed. Note that the packing is configured to be broken or peeled off at the time of activation.

Moreover, in the above embodiment, the parachute or the paraglider is exemplified as the ejection object, but the ejection material is not limited thereto, and one including a lift generation member may be ejected as the ejection object.

Examples of the lift generation member include a parafoil, a rogalo parachute, a single surface parachute, an airplane wing, a propeller, and a balloon. Furthermore, in a case where the lift generation member has a control line, it is desirable that the safety device include a steering mechanism capable of changing an inclination angle of the ejected lift generation member using the control line. This steering mechanism includes, for example, a plurality of reels for winding up a plurality of the control lines coupled to the lift generation member, respectively, and a motor serving as power of these reels. By winding up or pulling out the control lines by driving the motor, it is possible to appropriately pull the lift generation member or loosen the tension.

Furthermore, instead of the parachute or the paraglider, a flight vehicle provided with a safety device capable of ejecting a net may be used. Thus, when the net is ejected toward a hook or a projection at the same timing, the flight vehicle can be hooked on the hook or the projection. As a result, it is possible to prevent the flight vehicle from falling and colliding with the ground. Furthermore, instead of the parachute or the paraglider, a drug, a load, or the like may be ejected.

Furthermore, the flight vehicle may be provided with a safety device capable of ejecting a contracted or folded floating wheel (float) together with a drive mechanism (an expansion device including a gas generator or the like) by an actuator and expanding and deploying the floating wheel by the drive mechanism. As a result, it is possible to prevent the flight vehicle from being submerged, and it is possible to mark a recovery place when the flight vehicle crashes.

Furthermore, the flight vehicle may be a flight vehicle provided with a safety device capable of ejecting a contracted or folded floating wheel (float) and a parachute together with a drive mechanism (an expansion device including a gas generator and the like) by an actuator and deploying the floating wheel and the parachute by the drive mechanism. As a result, it is possible to reduce the falling speed of the flight vehicle at the time of crash, prevent the flight vehicle from being submerged, and serve as a mark of a recovery place when the flight vehicle crashes.

Furthermore, a parachute may be ejected together with a drive mechanism (such as a cutting device including a drive unit) by an actuator, and after the parachute is deployed, a part of a plurality of coupling members coupling the parachute and the flight vehicle may be cut by the drive mechanism, the parachute and the flight vehicle may be dropped sideways with the center of gravity of the airframe of the flight vehicle shifted, and thereafter, the flight vehicle may be provided with a safety device capable of mitigating impact of collision with the ground or the like using an airbag device provided on a side surface on a falling side of the flight vehicle.

Furthermore, a so-called paramotor may be ejected together with a drive mechanism (including a drive unit such as a power supply) by an actuator, and the flight vehicle may be provided with a safety device capable of rotating the propeller by driving the motor by the drive mechanism after the parachute or the paraglider is completely deployed. This prevents the parachute or the paraglider from getting entangled in the propeller. Note that the paramotor is capable of flying by providing power (such as a propeller rotary machine by a motor) in a harness portion of the parachute or the paraglider and obtaining thrust.

Furthermore, the flight vehicle may be provided with a safety device capable of emitting a sound generator together with a drive mechanism (including a drive unit such as a power supply) by an actuator, activating the sound generator when the flight vehicle falls by the drive mechanism, and notifying the surroundings of danger.

Furthermore, the flight vehicle may be provided with a safety device capable of emitting a lighting device (such as a flash light) together with a drive mechanism (including a drive unit such as a power supply) by an actuator, activating the lighting device by the drive mechanism when the flight vehicle falls, and notifying the surroundings of danger.

Furthermore, the flight vehicle may be provided with a safety device capable of spraying a fire extinguishing agent to the airframe and the surroundings of the flight vehicle by ejecting the fire extinguisher together with a drive mechanism (including a drive unit such as a power supply) by an actuator and activating the fire extinguisher when the flight vehicle falls by the drive mechanism.

Furthermore, the flight vehicle may be provided with a safety device that ejects, together with a drive mechanism, a parachute-equipped mounted object (for example, expensive devices) mounted in advance in an ejectable manner by an actuator, and causes the drive mechanism to deploy the parachute of the parachute-equipped mounted object. As a result, the parachute-equipped mounted object can be intensively protected.

Furthermore, the air vehicle may be a flight vehicle provided with a safety device that ejects, together with a drive mechanism (an expansion device including a gas generator or the like), a mounted object with an airbag device (for example, expensive devices) mounted in advance in an ejectable manner by an actuator, and inflates and deploys the airbag of the mounted object with an airbag device by the drive mechanism. Accordingly, it is possible to intensively protect the mounted object with the airbag device.

Furthermore, a flight vehicle may be provided with a safety device capable of ejecting a rescue signal transmission device together with a drive mechanism (including a drive unit such as a power supply) by an actuator, activating the rescue signal transmission device when the flight vehicle falls by the drive mechanism, and transmitting a rescue signal to the outside. As a result, in a case where the flight vehicle crashes, the crash point can be specified.

Furthermore, the flight vehicle may be provided with a safety device in which a black box with a parachute (such as a flight recorder) is ejected together with a drive mechanism (such as an expansion device including a gas generator) by an actuator, and the parachute of the black box with a parachute is deployed by the drive mechanism when the flight vehicle crashes. Accordingly, the black box with a parachute can be intensively protected. As a result, the flight data can be protected.

Figure 7:
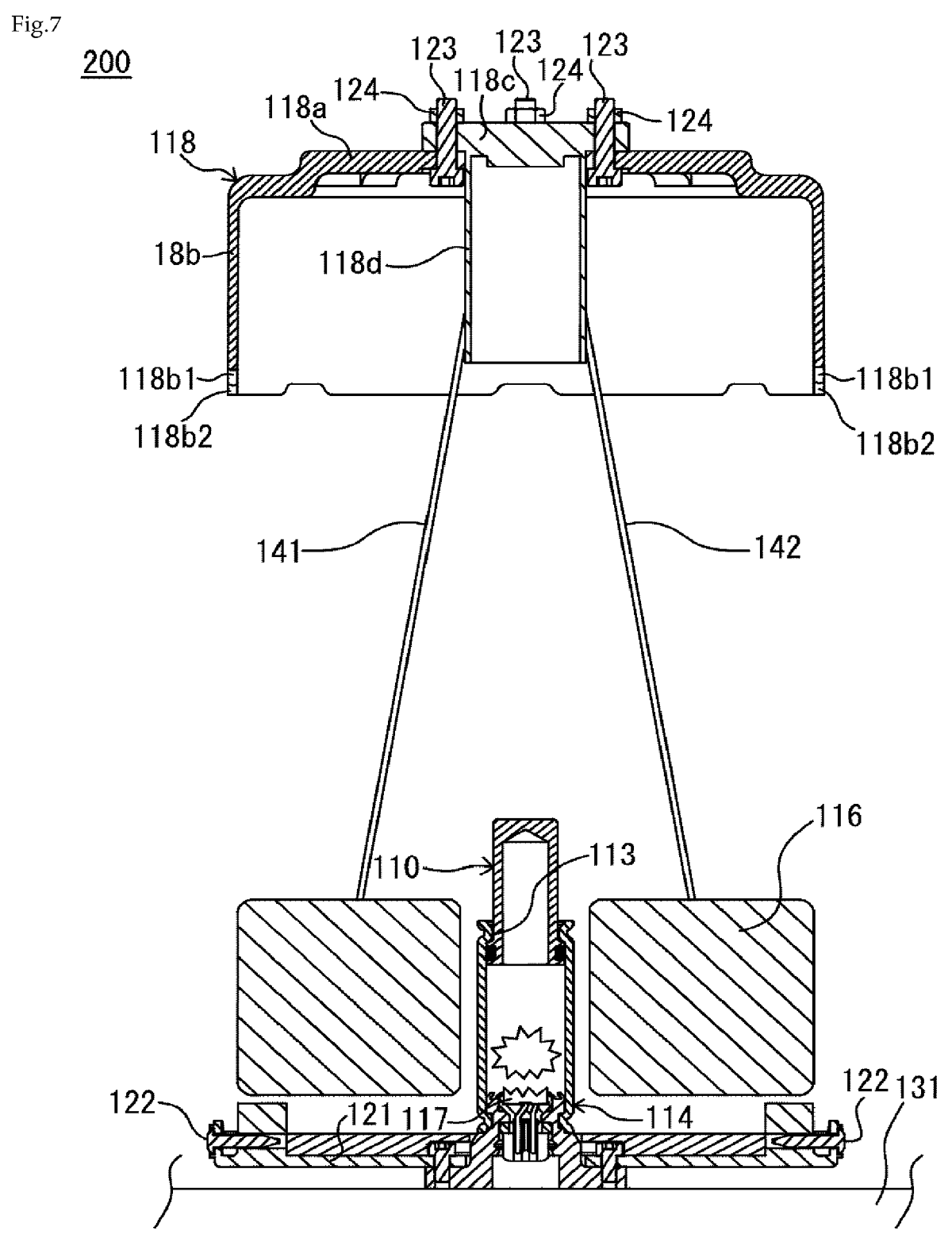

Furthermore, the safety device according to the present invention may be a safety device 200 as illustrated in FIG. 7. Hereinafter, the safety device 200 will be described. However, unless otherwise specified, parts similar to those in the above embodiment are denoted by the same reference signs in the last two digits, and the description thereof may be omitted. Furthermore, since portions that are not particularly described are the same as those in the above embodiment, the description thereof will be omitted.

The safety device 200 is different from the above-described embodiment in that (1) a cylindrical portion 118d is provided in the lower portion of a disk portion 118c, (2) the cylindrical portion 118d is disposed so as to cover the outside of a cylinder 114 in the initial state before operation, and (3) each one end of coupling members 141 and 142 is coupled to the lower portion of the cylindrical portion 118d.

According to the safety device 200 having the above configuration, the same effects as those of the safety device 100 can be obtained. Furthermore, since the cylindrical portion 118d is disposed so as to cover the outside of cylinder 114, an emission direction of the housing lid 118 can be restricted in the central axis direction of the cylinder 114.

Furthermore, since one end of each of the coupling members 141 and 142 is coupled to the lower portion of the cylindrical portion 118d and the other end of each of the coupling members 141 and 142 is connected to the ejection object 116, the ejection object 116 and the housing lid 118 can be easily coupled at the time of assembly as compared with the case where one end of each of the coupling members 141 and 142 is coupled to a location other than the lower portion of the cylindrical portion 118d, and as a result, the assembly work of the safety device 200 is facilitated.

Furthermore, since a space in which the ejection object 116 is accommodated and a space in which the cylinder 114 (actuator) is accommodated are partitioned by the cylindrical portion 118d, the assembly work is further facilitated. That is, in a case where the cylindrical portion 118d is not provided in the housing lid 118 (the lower portion of the disk portion 118c), the space in which the ejection object 116 is accommodated and the space in which the cylinder 114 (actuator) is accommodated are accommodated in one accommodation space. Therefore, it is necessary to assemble the ejection object 116 to the housing lid 118 so that the ejection object 116 and the cylinder 114 (actuator) do not overlap in the housing lid 118, which may become a factor of complicating the assembly work. On the other hand, according to the safety device 200, since the factor can be eliminated, the assembly work including the assembly can be facilitated.

Furthermore, in a case where the cylindrical portion 118d is provided near the center of the housing lid 118, the center of gravity of the container approaches the center, and thus, it is easy to grasp the position of the center of gravity of the safety device 200. That is, it is possible to easily determine the attachment position of the safety device 200 to the flight vehicle in a case where it is necessary to consider the balance of the center of gravity of the flight vehicle when the safety device 200 is attached to the flight vehicle.

Figure 8:
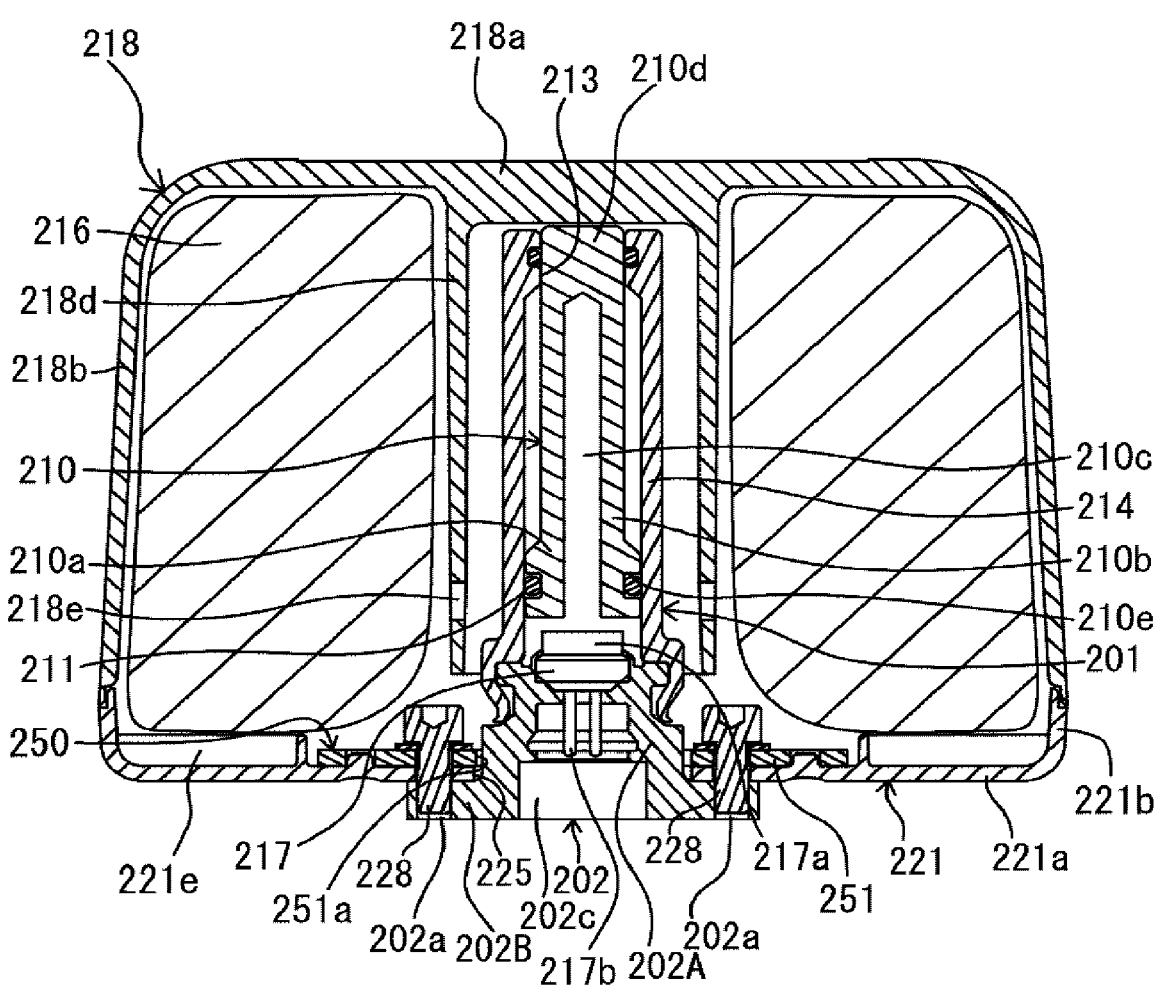
FIG. 8 is a cross-sectional view illustrating an initial state of a safety device according to another modification of the present invention.

Furthermore, the safety device according to the present invention may be a safety device 300 as illustrated in FIG. 8. Hereinafter, the safety device 300 will be described with reference to FIGS. 8 to 10. However, unless otherwise specified, parts similar to those in the above embodiment and the above modification are denoted by the same reference signs in the last two digits, and description thereof may be omitted. Furthermore, a portion that is not particularly described is a portion similar to any one of the above embodiment and the above modification, and thus the description thereof may be omitted.

Figure 9:
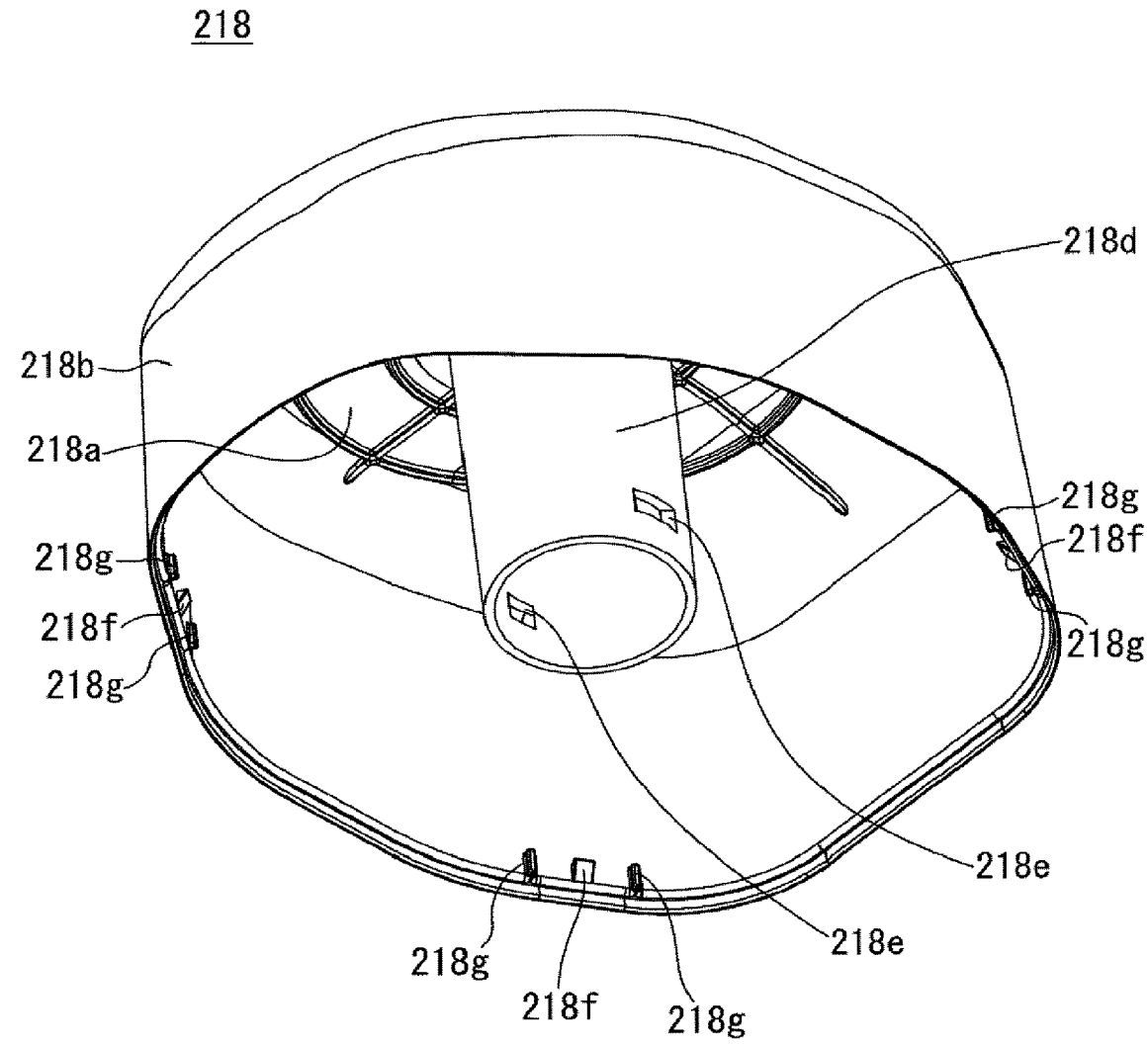
FIG. 9 is a perspective view illustrating a housing lid of the safety device of FIG. 8.
Figure 10:
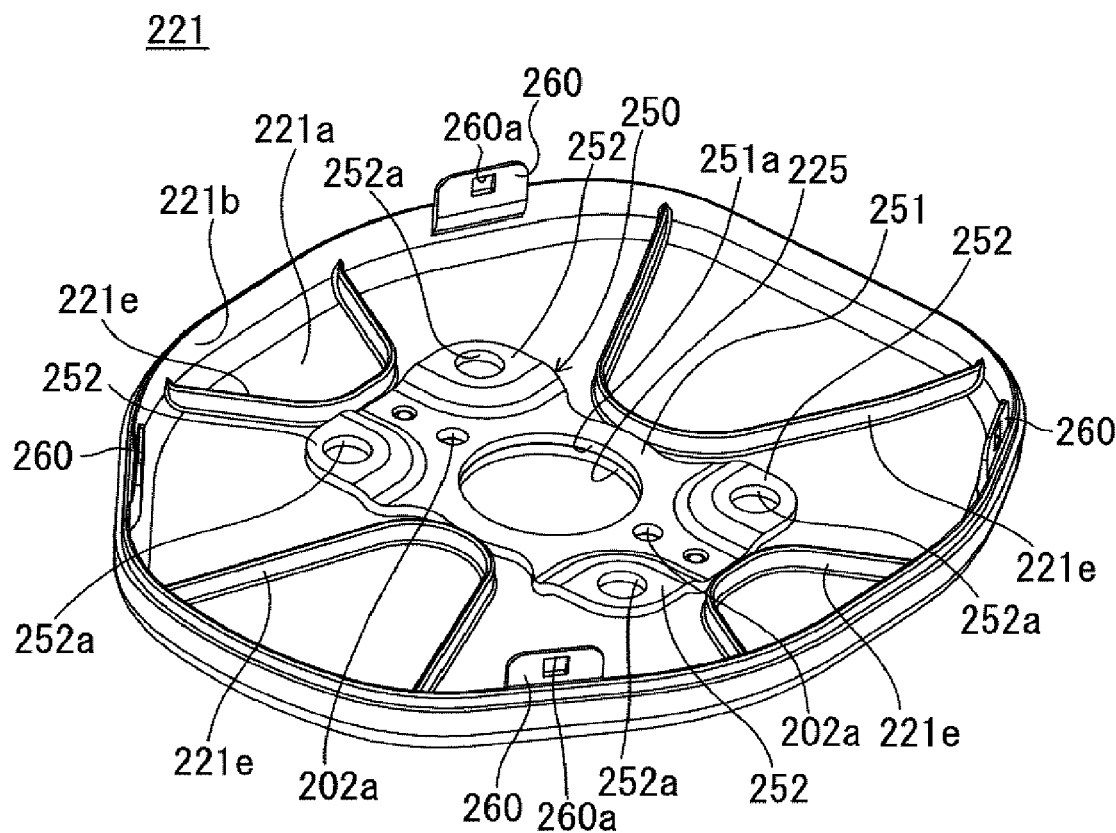
FIG. 10 is a perspective view illustrating a bottom portion of the safety device of FIG. 8.

As illustrated in FIGS. 8 to 10, the safety device 300 is different from the embodiment and the modification mainly in that a container having a housing lid 218 and a bottom portion 221 is used instead of the container in the embodiment and the modification.

As illustrated in FIGS. 8 and 9, the housing lid 218 includes a top plate portion 218a, a side portion 218b, and a cylindrical portion 218d which are integrally molded. The side portion 218b is different from the side portion 118b described above in that the side portion 218b includes a claw portion 218f provided on an inner circumferential surface of the opening end portion and a pair of guide portions 218g provided so as to be parallel to the claw portion 218f at a predetermined distance. Note that the pair of guide portions 218g are portions capable of guiding a protruding portion 260 to be described later in a case where assembling the housing lid 218 and the bottom portion 221.

The cylindrical portion 218d is different from the above-described cylindrical portion 118d in that (1) a pair of hole portions 218e capable of fastening and fixing one end of a pair of coupling members (same as the coupling members 141 and 142) not illustrated is provided near an end portion on a side of the bottom portion 221, and (2) one end portion is fixed to a side of the bottom portion of the top plate portion 218a by integral molding.

The bottom portion 221 includes a bottom plate portion 221a and a side portion 221b, and is different from the above-described bottom portion 121 in that a fastening member 250 for fastening the other end of each of a plurality of coupling members (not illustrated) one end of which is connected to the ejection object 216 is provided on an inner surface of the bottom plate portion 221a, and that a protruding portion 260 erected along an emission direction of the housing lid 218 is provided on an inner circumferential surface of the side portion 221b.

The fastening member 250 includes a hole portion 251a, includes an addressing portion 251 applied to an inner surface of the bottom plate portion 221a, and includes a plurality of (In FIG. 10, four locations are provided as an example.) connection portions 252 including hole portions 252a. Furthermore, the fastening member 250 is fixed to the bottom plate portion 221a by a bolt 228. Furthermore, a cylindrical member 202A of the base 202 fixed to the bottom plate portion 221a by the bolt 228 is inserted into the hole portion 251a, and the other ends of a plurality of coupling members (not illustrated) having one ends coupled to the ejection object 216 described above are fastened and fixed to the hole portion 252a by binding or fastening together by a bolt or the like.

The protruding portion 260 includes a hole portion 260a capable of locking the claw portion 218f described above in the vicinity of the tip portion. Furthermore, a size of the width (lateral direction) of the protruding portion 260 is formed slightly smaller than a distance between the pair of guide portions 218g so as to be guided by the pair of guide portions 218g. As a result, it is easy to align the claw portion 218f and the hole portion 260a, and as a result, it is easy to assemble the safety device 300. Furthermore, since the positional deviation between the housing lid 218 and the bottom portion 221 is less likely to occur, an excessive pushing due to the positional deviation is eliminated, and it is possible to prevent breakage of the container at the time of assembling. Furthermore, after the housing lid 218 is assembled to the bottom portion 221, it is possible to suppress deformation (deformation called backlash, etc.) of the entire shape. Furthermore, it is possible to suppress the ejection object 216 (parachute, paraglider, or the like) from being caught when the housing lid 218 is assembled to the bottom portion 221.

Note that, in a case where the safety device 300 is adopted, the configuration for locking the housing lid including the pin member and the receiving member and the bottom portion in the above embodiment may not be provided.

Furthermore, in a case where the hole portion 218e is provided in the cylindrical portion 218d, if the housing lid 218 including the cylindrical portion 218d is molded with resin, the hole portion 218e is relatively easily molded.

REFERENCE SIGNS LIST 1, 201 actuator
2, 202 base

14

2A, 202A cylindrical member
2B, 202B flange portion
2a, 10c, 13, 18a1, 18a2, 25, 21g, 113, 202a, 210c, 213, 225 bore portion
2c, 202c insertion port
10, 110, 210 piston member
10a, 210a main body portion
10b, 210b rod-shaped portion
10d, 210d tip portion
10e, 210e groove portion
11, 211 sealing member
14, 114, 214 cylinder
16, 116, 216 ejection object
17, 117, 217 gas generator
17b, 217b electrode
18, 118, 218 housing lid
18a, 118a, 218a top plate portion
18b, 118b, 218b, 221b side portion
18b1, 118b1 first through hole
18b2, 118b2 breakable portion
18c, 118c disk portion
21, 121, 221 bottom portion
21a protruding portion
21b receiving member
21c, 21d second through hole
21e, 221e reinforcement member
21f cylindrical projecting portion
22, 122 pin member
22a head portion
22b rod-shaped portion
23, 28, 123, 228 bolt
24, 124 nut
30 flight vehicle
31, 131 airframe
33 leg
41, 42, 43, 141, 142 coupling member
100, 200, 300 safety device
118d, 218d cylindrical portion
218e, 251a, 252a, 260a hole portion
218f claw portion
218g guide portion
221a bottom plate portion
250 fastening member
251 addressing portion
252 connection portion
260 protruding portion

The invention claimed is:

1. A safety device for a flight vehicle comprising:
a cylindrical member including an opening end portion provided at a first end and a top plate portion provided at a second end;
a bottom portion attached to the opening end portion of the cylindrical member in an initial state, so that the opening end portion can be opened at a time of activation;
an actuator provided on the bottom portion, and including a piston and a power source configured to generate a driving force for ejecting the cylindrical member by sliding the piston toward the top plate portion and cause the piston to contact the cylindrical member;
a parachute or paraglider configured to be accommodated between the cylindrical member and the bottom portion;
a first coupling member including a first end coupled to the parachute or paraglider and a second end coupled to the cylindrical member; and a second coupling member including a first end coupled to the piston and a second end coupled to the parachute or paraglider, wherein when the cylindrical member is ejected, the parachute or paraglider is also configured to be ejected via the first coupling member, wherein the first end of the second coupling member is connected to a position of the piston's tip that does not interfere with the contact between the piston and the cylindrical member, and where in the bottom portion is configured to be fixed to an airframe of the flight vehicle.

2. The safety device according to claim 1, wherein the piston is provided at a position where the piston contacts a central portion of the top plate portion of the cylindrical member at a time of activation, and the central portion is a portion or a member having higher strength than a portion other than the central portion and having impact strength against impact when the piston contacts the central portion.

3. The safety device according to claim 1, wherein the second end of the first coupling member is coupled to a location other than a position where the piston contacts a central portion, and the central portion is a portion or a member having higher strength than a portion other than the central portion and having impact strength against impact when the first coupling member is pulled at the time of activation.

4. The safety device according to claim 1, wherein the bottom portion includes a protruding portion at an edge portion, the protruding portion facing a side wall portion of the cylindrical member before activation, the safety device further comprising:

an engagement mechanism that engages a side wall portion of the opening end portion and the protruding portion by inserting a pin member into a first through hole penetrating toward a center of the cylindrical member in the side wall portion of the opening end portion and a second through hole penetrating toward a center of the bottom portion in the protruding portion; or a locking mechanism that locks the side wall portion of the opening end portion and the protruding portion by a snap-fit method in which fitting is performed using elasticity of a material constituting the cylindrical member or the protruding portion.

5. A flight vehicle comprising:

an airframe;

the safety device according to claim 1 coupled to the airframe, a payload being the flight vehicle; and a propulsion mechanism coupled to the airframe to propel the airframe.

6. The safety device according to claim 2, wherein the second end of the first coupling member is coupled to a location other than a position where the piston abuts on the central portion, and the central portion is a portion or a member having higher strength than a portion other than the central portion and having impact strength against impact when the first coupling member is pulled at a time of activation.

7. The safety device according to claim 2, wherein the bottom portion includes a protruding portion at an edge portion, the protruding portion facing a side wall portion of the cylindrical member before activation, the safety device further comprising:

an engagement mechanism that engages a side wall portion of the opening end portion and the protruding portion by inserting a pin member into a first through hole penetrating toward a center of the cylindrical member in the side wall portion of the opening end portion and a second through hole penetrating toward a center of the bottom portion in the protruding portion; or a locking mechanism that locks the side wall portion of the opening end portion and the protruding portion by a snap-fit method in which fitting is performed using elasticity of a material constituting the cylindrical member or the protruding portion.

8. The safety device according to claim 3, wherein the bottom portion includes a protruding portion at an edge portion, the protruding portion facing a side wall portion of the cylindrical member before activation, the safety device further comprising:

an engagement mechanism that engages a side wall portion of the opening end portion and the protruding portion by inserting a pin member into a first through hole penetrating toward a center of the cylindrical member in the side wall portion of the opening end portion and a second through hole penetrating toward a center of the bottom portion in the protruding portion; or a locking mechanism that locks the side wall portion of the opening end portion and the protruding portion by a snap-fit method in which fitting is performed using elasticity of a material constituting the cylindrical member or the protruding portion.

9. A flight vehicle comprising:

the airframe;

the safety device according to claim 2 coupled to the airframe, a payload being the flight vehicle; and a propulsion mechanism coupled to the airframe to propel the airframe.

10. A flight vehicle comprising:

the airframe;

the safety device according to claim 3 coupled to the airframe, a payload being the flight vehicle; and a propulsion mechanism coupled to the airframe to propel the airframe.

11. A flight vehicle comprising:

the airframe;

the safety device according to claim 4 coupled to the airframe, a payload being the flight vehicle; and a propulsion mechanism coupled to the airframe to propel the airframe.

12. The safety device according to claim 1, wherein the piston is located in a center of the bottom portion and the cylindrical member is ejected in a sliding direction.

13. The safety device according to claim 1, wherein the piston is not ejected.

* * * * *